May 10, 1932.   C. H. H. RODANET   1,857,261
WINDSCREEN ADJUSTING MECHANISM
Filed April 15, 1929
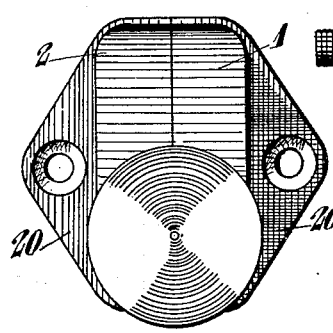
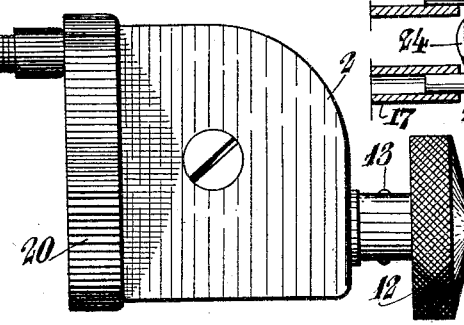
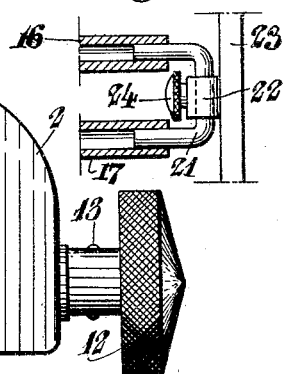
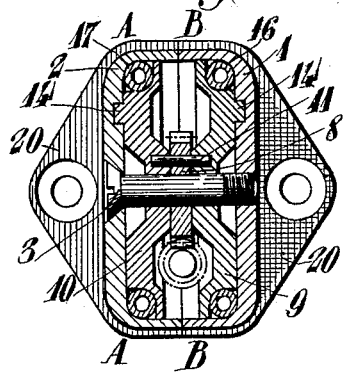
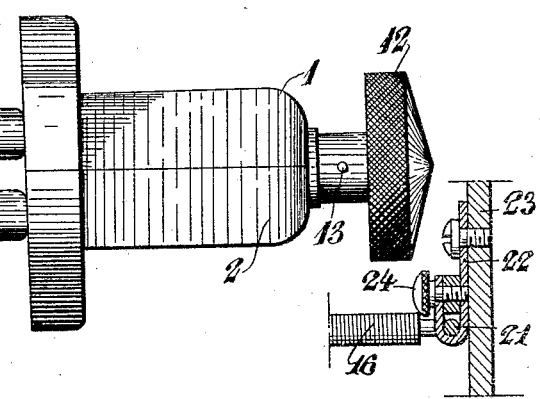
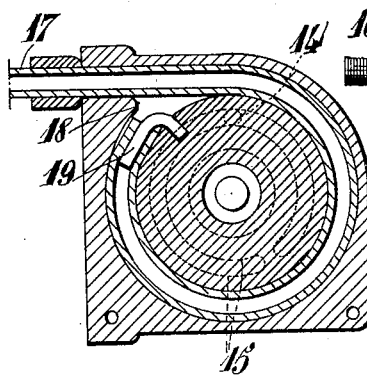
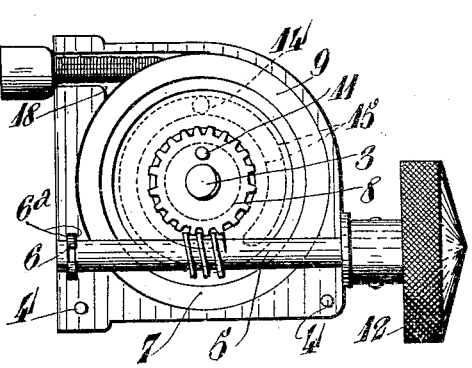
C. H. H. Rodanet
INVENTOR Patented May 10, 1932

1,857,261

UNITED STATES PATENT OFFICE

CHARLES HILAIRE HENRI RODANET, OF VERSAILLES, FRANCE, ASSIGNOR TO SOCIÉTÉ ANONYME: ETABLISSEMENTS ED. JAEGER, OF SEINE, FRANCE, A JOINT-STOCK COMPANY OF FRANCE

WINDSCREEN ADJUSTING MECHANISM

Application filed April 15, 1929, Serial No. 355,297, and in France April 20, 1928.

The present invention relates to mechanisms allowing, from the interior of a motor car, to adjust the inclination of the front wind screen, without the driver being compelled to rise from his seat.

The known mechanisms are usually applied to wind screens pivoted at their upper part on the front posts of the carriage body, so that their lower edge may be moved away at will from the awning arched member of the driver's place for providing an adjustable air inlet within the car. These mechanisms comprise rigid members which, even when the wind screen is completely tilted in closed position, are very apparent and spoil the look of the car; they have, moreover, the inconvenience of constituting a rigid connection between the wind screen and the awning of the driver's place, this causing abnormal stresses on the various joints when the carriage body becomes distorted.

For remedying these inconveniences, the invention has for object the new application to wind screen adjusting mechanisms, of resiliently distortable connections capable of exerting both a pulling and a pushing action on the wind screen and of becoming distorted in order to be withdrawn within a reduced space. Wind screen adjusting mechanisms to which are applied these resiliently distortable connections can be constructed in various ways. They can differ from each other particularly:

(a) By the choice of the operating member and the nature of the displacements adopted for the latter.

(b) By the kinematic system chosen for connecting this operating member to the flexible connections acting on the wind screen.

(c) By the mode of construction of the flexible connections.

In a form of construction of such a mechanism which seems to be the most advantageous, the operating member receives movements of rotation and is angularly connected to a drum on which is secured one of the ends of the flexible connections acting on the wind screen to be controlled.

The accompanying drawings illustrate, by way of example, a form of construction of a wind screen adjusting mechanism utilizing the above arrangement.

Figure 1 is an external front view of the mechanism.

Figure 2 is an external elevation.

Figure 3 is a corresponding plan view.

Figure 4 is a cross section made through a plane containing the axis of the drum to which is attached the resiliently distortable member.

Figures 5 and 6 are two sections, made respectively according to lines A—A and B—B of Fig. 4.

Figures 7 and 8 are respectively a front view and a side view of a device for attaching on the wind screen the resiliently distortable member.

The operating mechanism comprises a frame constituted by a casing made in two parts 1 and 2 the connection of which is ensured by a screw 3 and the suitable relative position of which are determined by the engagement of claws, provided on one of the said parts, into perforations 4 (Fig. 6) formed in the other part.

The contact faces of the parts 1 and 2 are cut away so as to present bearing portions for a spindle 5 immobilized in translation by the engagement of a collar 6 in grooves $6^a$. The spindle 5 passes through the inner cavity or chamber of the casing and carries a worm 7 constantly gearing with a worm wheel 8 loosely mounted on an axis constituted by the screw 3 connecting both parts 1 and 2 of the casing. Two pulleys 9 and 10 are loosely mounted on the screw 3, on either side of the worm wheel 8 and are rendered angularly rigid with the latter by a transverse rod 11 or any equivalent means. The spindle 5 receives, externally to the casing, an operating handle which, as in the example illustrated, can be constituted by a knob 12 having a milled periphery, pinned at 13 and owing to which a movement of rotation in one direction or the other can be imparted to both pulleys 9 and 10. The extreme angular positions of the pulleys 9 and 10 can be determined by abutments and, for instance, by bosses or claws 14 pressing against the ends of grooves 15 formed on the side walls of the casing, co-axially with the screw 3.

In the particular example illustrated in the drawings, the resiliently distortable member acting on the wind screen, is double and constituted, for instance, by two tubes 16 and 17 obtained by the winding of steel wires, the turns of which preferably touch each other, and having a cross section suited to the importance of the stresses to be transmitted.

These tubes enter within the casing through perforations 18 provided in the front wall of the said casing and located in the planes of the peripheral grooves of each of the pulleys 9 and 10. The tubes 16 and 17 can be attached to the said pulleys by any suitable means and, for instance, and as illustrated, by the engagement in a radial perforation of each pulley of the end heel piece of a bent rod 19 (Fig. 5) fitted into one of the tubes and soldered to the turns of the latter.

The casing is secured, by lugs 20 perforated for the passage of screws or bolts, within the part of the car reserved for the driver and, for instance, on the awning arched member, so that the driver may have easy access to the operating knob 12. The outer ends of the tubes 16 and 17 are secured to the lower edge of the wind screen.

The connection of the tubes 16 and 17 to the wind screen can be effected by any suitable means and, particularly, by means of the simple device illustrated in Figs. 7 and 8 and included in the scope of the invention.

The free ends of both tubes 16 and 17 are connected by a yoke constituted by a rod 21 the bent ends of which fit in the tubes on a certain width and are held therein by soldering or any equivalent means. A fork-piece 22 embraces the middle portion of the rod 21 and is secured on the lower edge of the wind screen 23 by one or more screws 24. It will be seen that according to the direction of the rotation imparted to the knob 12, the tubes exert a thrust or a pull on the wind screen 23 for opening or closing the latter. In the closed position, the tubes 16 and 17 are nearly completely withdrawn within the casing and the apparent members on the outer face of the wind screen are constituted by a branch, of reduced dimension, of the fork-piece 22.

As indicated above, no rigid connection is interposed between the wind screen and its operating mechanism, so that the distortions of the carriage can freely take place.

The invention is not obviously limited to the form of construction illustrated in the accompanying drawings. It can receive constructional modifications the details of the execution of which are included in the scope of the invention if they concur to carry out the feature set forth in the foregoing for defining this invention.

What I claim as my invention and desire to secure by Letters Patent is:—

1. In a mechanism for operating the wind screens of motor vehicles, a flexible cable capable of transmitting pulling and pushing strains, means for securing one end of the said cable to the wind screen, a fixed frame, a drum adapted to rotate in the said fixed frame, means for securing the second end of the cable to the said drum, operating means for rotating the said drum, acting to prevent accidental rotation of the said drum when not acted upon by the said operating means.

2. In a mechanism for operating the wind screens of motor vehicles, a flexible cable capable of transmitting pulling and pushing strains, means for securing one end of the said cable to the wind screen, a fixed frame, a drum adapted to rotate in the said fixed frame, means for securing the second end of the cable to the said drum and irreversible operating means for rotating the said drum.

3. In a mechanism for operating the wind screens of motor vehicles, a flexible cable capable of transmitting pulling and pushing strains, means for securing one end of the said cable to the wind screen, a fixed frame, a drum adapted to rotate in the said fixed frame, means for securing the second end of the cable to the said drum, a helicoidal toothed wheel, means for securing the said wheel to the said drum, a screw engaging with the said wheel and means for rotating the said screw at will.

4. In a mechanism for operating the wind screens of motor vehicles, two flexible cables capable of transmitting pulling and pushing strains, means for simultaneously securing one end of each of the said cables to the wind screen, a fixed frame, a drum adapted to rotate in the said fixed frame, means for securing the second end of each of the said cables to the said drum, operating means for rotating the said drum acting to prevent accidental rotation of the said drum when not acted upon by the said operating means.

In testimony whereof I have signed this specification.

CHARLES HILAIRE HENRI RODANET.